Patented Dec. 29, 1942

2,306,455

UNITED STATES PATENT OFFICE 2,306,455

REFINING OF ROSIN AND THE LIKE

Robert W. Martin, Wilmington, Del., assignor to Hercules Powder Company, Wilmington, Del., a corporation of Delaware No Drawing. Application October 28, 1939,
Serial No. 301,753

20 Claims. (Cl. 260—107)

This invention relates to an improved method of refining rosin and rosin esters, and more particularly to an improved method of removing color bodies from such materials.

Unrefined rosin and rosin derivatives contain color bodies and also substances which do not contribute color to the rosin itself but develop color when the rosin is treated with alkali or treated with alkali and exposed to air. These bodies render the materials unsuitable for use in the production of various products in which a light color is desired. Heretofore, rosin and rosin derivatives have been refined by dissolving the material in gasoline and treating the resulting solution with absorbents which selectively absorb color bodies. However, although a considerable portion of the color bodies may be removed by such processes, there is much room for improvement as very light colored materials have been obtainable only at a considerable loss of yield.

The use of gaseous hydrocarbons, such as ethane, ethylene, propane, and propylene, etc. at temperatures and pressures at which they become liquid, has been proposed for replacing the gasoline solvent. By this method a limited improvement is obtained, but from a practical standpoint, the use of normally gaseous hydrocarbons is very undesirable as gas-tight pressure sustaining equipment, which is expensive, must be used. Further, gas leaks from a system under pressure are very dangerous, as the gases tend to escape rapidly and readily form explosive mixtures with air over a wide range of proportions and so entail a serious hazard of explosion.

It is an object of this invention to provide a convenient, safe, and economical improved method of obtaining rosin and rosin derivatives which are pale in color.

It is a further object to provide a method for refining rosin and rosin derivatives to remove color bodies therefrom, whereby a paler product can be obtained at a given yield.

It is also an object to provide a method for refining rosin and rosin derivatives whereby a higher yield of product can be obtained at a given product color.

Other objects will appear as this invention is described. Now in accordance with this invention a rosin or rosin derivative containing color bodies is dissolved in a gasoline which has been treated with a reagent adapted to absorb aromatic and non-aromatic unsaturated compounds therefrom, whereby such compounds have been eliminated from the gasoline. The solution is then treated with a substance substantially insoluble therein, and which has a capacity for absorbing color bodies therefrom. Following this treatment, the rosin or rosin derivative is recovered from the gasoline solution.

The process of this invention is particularly suited for refining rosin containing visible or latent color bodies, for example, wood or gum rosin. It is also suitable for refining rosin derivatives such as rosin esters, for example, ester gum and the esters of rosin acid with methanol, ethanol, propanol, butanol, amyl alcohol, cetyl alcohol, lauryl alcohol, stearyl alcohol, furfuryl alcohol, hydrofurfuryl alcohol, abietanol, hydroabietanol, phenol, benzyl alcohol, etc., or with polyhydric alcohols, such as, for example, ethylene glycol, diethylene glycol, triethylene glycol, glycerol, sorbitol, mannitol, erythritol, pentaerythritol, etc., where such derivatives contain visible or latent color bodies. It is also suitable for refining modified rosins such as hydrogenated rosin, rosin subjected to hydrogenating catalysts and conditions without hydrogen being added, polymerized rosin and esters of the such modified rosins with alcohols such as were hereinabove mentioned; similarly it is suitable for rosin alcohols and hydrogenated rosin alcohols such as are obtained by reducing the rosin acid carboxyl group to a hydroxyl, i. e. abietic acid to abietanol, etc., and organic esters thereof, and for other rosin derivatives of like nature, where such derivatives contain visible or latent color bodies.

The gasoline which I use in the method of this invention will have a boiling point above atmospheric temperatures, for example, within the range from about 40° C to about 300° C., preferably in the range from about 65° C. to 130° C. This gasoline will consist of saturated petroleum hydrocarbons, that is, constituents of the group consisting of aromatic and non-aromatic unsaturated compounds normally present in all gasoline have been removed. The gasoline may thus consist of a mixture of straight chain, branch chain, and naphthenic saturated hydrocarbons. Preferably, however, naphthenic hydrocarbons will be in as low proportion as possible, and prefably, straight chain compounds will be in as high a proportion as possible, a gasoline of 100% straight chain saturated hydrocarbons being considered ideal.

The source of the gasoline may be any of the usual crude petroleums. The gasoline may be obtained therefrom by straight fractionation, cracking, reforming, hydrogenation, etc., and combinations thereof. Preferably, a straight distillate of a paraffin base petroleum, is utilized.

The gasoline utilized according to this invention is treated to remove any aromatic and non-aromatic unsaturated hydrocarbons, suitably by means of sulfuric acid. For this purpose, the sulfuric acid is preferably in concentrated or fuming form. The acid may be agitated with the gasoline, settled, and separated therefrom, and the gasoline is then washed with water. Preferably, the water wash is preceded with an alkaline wash such as a solution of caustic soda or soda ash in water.

It has been found that reagents other than sulfuric acid are adapted to absorb unsaturated constituents from the gasoline. For example, the gasoline may be treated with furfural, liquid sulfur dioxide, nitrobenzene, pridine, benzonitrile, benzaldehyde, o-nitrotoluene, alkyl sulfates, phenols, aniline, liquid dinitrotoluene, etc. Some of these reagents remove a portion of the saturated napthenic as well as the various unsaturated compounds which is considered advantageous. Treatment with these reagents consists of agitating the reagent with the gasoline and then separating it therefrom, or contacting the gasoline and the reagent in a continuous countercurrent extraction system.

The solution of unrefined rosin or rosin derivative, in the gasoline treated as hereinbefore mentioned, may be treated by any of the large number of substances which are substantially insoluble in the solution and which have a capacity for absorbing color bodies therefrom. The term "absorbing" as used herein and in the claims includes both absorbing as by a solid, and dissolving and retaining as by a liquid, thus removing color bodies from the gasoline solution in which they are dissolved.

Suitable solid absorbents are, for example, activated carbon, activated alumina, fuller's earth, absorbent clay or other absorbent earths, etc. Reference to fuller's earth and other absorbent earths, includes the earths per se or in an activated form, activated, for example, by treatment with an acid such as sulfuric, hydrochloric acid, etc. Treatment consists of suspending or agitating the absorbent in the gasoline solution and then separating the absorbent with the absorbed color bodies from the solution, or it may consist of passing the gasoline solution through a mass of absorbent. The latter type of treatment is convenient as it combines contacting and separating in a single operation.

Suitable liquid color body absorbing substances are, for example, furfural, furfuryl alcohol, a substantially immiscible chlorohydrin, as ethylene chlorohydrin, propylene chlorohydrin, etc., a phenol such as phenol, m-cresol, o-cresol, p-cresol, resorcinol, etc., usually liquefied by addition of water, aniline, ethylene glycol, propylene glycol, butylene glycol, diethylene glycol, trimethylene glycol, glycerol, butyl glycerol, ethyl formate, methyl acetate, methyl formate, methyl orthonitrobenzoate, methyl furoate, allyl formate, monoacetin, diacetin, triacetin, ethylene glycol monoacetate, methanol, a hydroxyl alkyl amine, as triethanolamine, a solution of oxalic acid in water or in methanol, ethanol or other lower aliphatic alcohol, ethylene glycol monoethyl ether, or other immiscible glycol ether, ethylene glycol monoacetate, or other immiscible glycol ester, methyl thiocyanate, ethyl thiocyanate, acetonitrile, acetic acid, acetic anhydride, p-chloroaniline, resorcinol plus hydrosulphite, a boron compound, ethylene glycol diacetate, glycerol diacetate, resorcinol monoacetate, resorcinol diacetate, phenyl acetate, furfuryl acetate, ethylidine diacetate, n-propyl furoate, ethyl glycollate, methyl citrate, ethyl tartrate, ethyl malonate, methyl maleate, dimethyl phthalate, benzyl formate, monobutyrin, ethyl carbonate, methyl lactate, diethyl oxalate, methyl adipate, hydroxyhydroquinone triacetate, methyl chlorocarbonate, propylene glycol monacetate, hydroquinone diacetate, catechol, monoacetate, guaiacyl acetate, methyl glutarate, ethyl oxalate, benzyl acetate, diethyl glutacoate, ethyl lactate, diethyl phthalate, ethyl anisate, methyl salicylate, methyl cinnamate, methyl mandelate, methyl acrylate, ethyl oxamate, methyl succinate, ethyl propiolate, ethyl acrylate, ethyl malate methoxybenzaldehyde, guaiacol, anisidin, nitroanisol, dichloroethyl ether, methoxy acetic acid, methyoxybenzyl alcohol, liquid sulfur dioxide, solutions of amphoteric metallic halides, nitro-alcohols, nitromethane, mixtures of such refining agents which are chemically non-reactive, etc. Treatment consists of agitating the absorbing liquid with the gasoline solution and separating the resulting two phases, for example, by decantation. Alternatively, the gasoline solution and liquid absorbent may be contacted in a continuous counter-current extraction system.

In further illustration of the method of this invention, the examples following are given. In these examples a standard refining treatment was established and used so that by obtaining comparable results, the advantages of the present method will be illustrated. This standard treatment consists of placing 40 grams of crude wood rosin extracted from pine stump wood by an aromatic hydrocarbon, 16 grams of furfural, and 280 grams of the gasoline to be tested in a bottle, replacing air in the bottle by carbon dioxide, and shaking from 60 to 90 minutes until solution and equilibrium at a predetermined temperature are obtained. The gasoline layer is then decanted into a separatory funnel and four more furfural washes, using 8 grams of furfural in each wash, are given. The temperature is controlled by a constant temperature bath during these operations. The refined rosin is recovered by evaporation of the gasoline utilizing a stream of carbon dioxide to prevent access of air to the rosin during evaporation.

All Lovibond colors herein shown were determined on cubes of the materials having two of its parallel surfaces seven-eighths inch apart. The colors of such cubes were measured by matching them with standard glasses of the Lovibond color scale, the amber 500 series and red 200 series being used. The color grade designations by letter, such as I, K, WW, etc., follow the official standards for rosin of the U. S. Department of Agriculture.

*Example 1*

A high grade solvent gasoline boiling entirely within the range of from 96° C. to 128° C. was given two 3 minute washes with about an equal weight of 98% sulfuric acid followed by one similar wash with 101% sulfuric acid, all washes being given at 65° C. The gasoline was then washed with caustic soda solution and finally with water. The treated gasoline was then used in the hereinabove mentioned standard refining test. A portion of the original untreated gasoline was used in the same manner in the standard test. The following results were obtained:

| | Refining temp. | Number of tests | Average yield of refined rosin |
|---|---|---|---|
| | °C. | | Per cent |
| Using original gasoline | 30 | 4 | 60.3 |
| Using treated gasoline | 30 | 3 | 60.1 |
| Using original gasoline | 0 | 3 | 57.3 |
| Using treated gasoline | 0 | 3 | 57.4 |

| | Average color of the refined rosin | |
|---|---|---|
| | Lovibond | Grade |
| Using original gasoline | 40 amber+3.60 red | I |
| Using treated gasoline | 29 amber+0.00 red | N |
| Using original gasoline | 40 amber+0.17 red | M |
| Using treated gasoline | 17 amber+0.00 red | WW |

The improved results obtained when using a specially treated gasoline are clearly shown.

Example 2

A sample of commercial hexane was treated with sulfuric acid in the same manner as the gasoline used in Example 1. Portions of both treated hexane and untreated hexane were then used in the standard refining test at 30° C. The results follow:

Yield of refined rosin (per cent)
Untreated hexane (first determination) ____ 59.0
Untreated hexane (second determination) __ 57.5
H₂SO₄ treated hexane (first determination) _ 50.8
H₂SO₄ treated hexane (second determination) _____ 57.5

| | Color of refined rosin | |
|---|---|---|
| | Lovibond | Grade |
| Untreated hexane (first determination). | 40 amber+1.75 red | K |
| Untreated hexane (second determination). | 40 amber+1.40 red | K |
| H₂SO₄ treated hexane (first determination). | 25 amber+0.00 red | WG |
| H₂SO₄ treated hexane (secnd determination). | 24 amber+0.00 red | WG |

Example 3

Gasoline of the type described in Example 1 was treated with two volumes of liquid sulfur dioxide for each volume of the gasoline at a temperature of −15° C. Utilized in the standard refining test, this treated gasoline gave a refined rosin having a Lovibond color of 40 amber+0.50 red and a color grade of "M." The untreated gasoline used in a similar manner gave the refined rosin with a Lovibond color of 40 amber+3.60 red, and an "I" color grade.

Example 4

Gasoline of the type described in Example 1 was treated with furfural using 2.9 volumes of furfural for each volume of gasoline at a temperature of −15° C. The treated gasoline, when used in the standard refining test, gave a refined rosin having a Lovibond color of 40 amber+1.50 red and a color grade of "K". The untreated gasoline used in a similar manner gave refined rosin with a Lovibond color of 40 amber+3.60 red and an "I" color grade.

Example 5

Gasoline of the type described in Example 1 was washed with nitrobenzene using 1.1 volumes of nitrobenzene for each volume of gasoline at a temperature of 0° C. The treated gasoline was then used in the standard refining treatment, giving a refined rosin having a Lovibond color of 40 amber+1.25 red and a color grade of "K." The untreated gasoline used in a similar manner gave the refined rosin with a Lovibond color of 40 amber+3.60 red and an "I" color grade.

The foregoing examples clearly show that, as compared with prior processes operating with the gasoline heretofore utilized, the process of this invention provides a lighter colored rosin at about the same or a higher yield. The improvement in grade is of considerable economic value. The method may also be used to provide a rosin of a given color at a substantially higher yield. The improvement is ascribed to the removal of aromatic and/or non-aromatic unsaturated compounds, some of which are always present in gasoline. In fact, such compounds have been considered desirable in gasoline intended as a motor fuel because of their anti-knock properties, and also in gasoline intended as a solvent, for example, in paints, varnishes, cleaners, etc. because of their superior solvent power. Thus, as shown by Example 2, even commercial hexane normally contains an appreciable portion of undesirable compounds which I find desirable to remove before utilizing the hexane in refining rosin.

It will be understood that details and examples hereinbefore set forth are illustrative only, and that the invention as broadly described and claimed is in no way limited thereby.

What I claim and desire to protect by Letters Patent is:

1. A process for refining a material selected from the group consisting of rosins, rosin esters, rosin alcohols and esters of rosin alcohols which comprises dissolving the material in a gasoline consisting of saturated petroleum hydrocarbons and characterized by the substantial absence of aromatic and non-aromatic unsaturated constituents and by a boiling point within the range from about 40° C. to about 300° C. at atmospheric pressure, treating the resulting solution with a substance substantially insoluble in the solution but having a capacity for absorbing color bodies therefrom, and recovering the material from the treated solution.

2. A process for refining a material selected from the group consisting of rosins, rosin esters, rosin alcohols and esters of rosin alcohols which comprises dissolving the material in a gasoline from which the aromatic and non-aromatic unsaturated constituents have been substantially completely removed by a prior treatment with a reagent adapted to absorb these constituents from the gasoline, said gasoline having a boiling point within the range from about 40° C. to about 300° C. at atmospheric pressure, treating the resulting solution with a substance substantially insoluble in the solution but having a capacity for absorbing the color bodies therefrom, and recovering the material from the treated solution.

3. A process for refining a material selected from the group consisting of rosins, rosin esters, rosin alcohols and esters of rosin alcohols which comprises dissolving the material in a gasoline from which the aromatic and non-aromatic unsaturated constituents have been substantially completely removed by a prior treatment with sulfuric acid, said gasoline having a boiling point within the range from about 40° C. to about 300° C. at atmospheric pressure, treating the resulting solution with a substance substantially insoluble in the solution but having a capacity for absorbing the color bodies therefrom, and recovering the material from the treated solution.

4. A process for refining a material selected from the group consisting of rosins, rosin esters, rosin alcohols and esters of rosin alcohols which comprises dissolving the material in a gasoline from which the aromatic and non-aromatic unsaturated constituents have been substantially completely removed by a prior treatment with furfural, said gasoline having a boiling point within the range from about 40° C. to about 300° C. at atmospheric pressure, treating the resulting solution with a substance substantially insoluble in the solution but having a capacity for absorbing the color bodies therefrom, and recovering the material from the treated solution.

5. A process for refining a material selected from the group consisting of rosins, rosin esters, rosin alcohols and esters of rosin alcohols which comprises dissolving the material in a gasoline from which the aromatic and non-aromatic unsaturated constituents have been substantially completely removed by a prior treatment with liquid sulfur dioxide, said gasoline having a boiling point within the range from about 40° C. to about 300° C. at atmospheric pressure, treating the resulting solution with a substance substantially insoluble in the solution but having a capacity for absorbing the color bodies therefrom, and recovering the material from the treated solution.

6. A process for refining a material selected from the group consisting of rosins, rosin esters, rosin alcohols and esters of rosin alcohols which comprises dissolving the material in a gasoline consisting of saturated petroleum hydrocarbons and characterized by the substantial absence of aromatic and non-aromatic unsaturated constituents and by a boiling point within the range from about 40° C. to about 300° C. at atmospheric pressure, treating the resulting solution with a liquid absorbent substantially insoluble in the solution but having a capacity for absorbing color bodies therefrom, and recovering the material from the treated solution.

7. A process for refining wood rosin which comprises dissolving the wood rosin in a gasoline consisting of saturated petroleum hydrocarbons and characterized by the substantial absence of aromatic and non-aromatic unsaturated constituents and by a boiling point within the range from about 40° C. to about 300° C. at atmospheric pressure, treating the resulting solution with a substance substantially insoluble in the solution but having a capacity for absorbing color bodies therefrom, and recovering the rosin from the treated solution.

8. A process for refining a material selected from the group consisting of rosins, rosin esters, rosin alcohols and esters of rosin alcohols which comprises dissolving the material in a gasoline consisting of saturated petroleum hydrocarbons and characterized by the substantial absence of aromatic and non-aromatic unsaturated constituents and by a boiling point within the range from about 40° C. to about 300° C. at atmospheric pressure, treating the resulting solution with a solid substance substantially insoluble in the solution but having a capacity for absorbing color bodies therefrom, and recovering the material from the treated solution.

9. A process for refining a material selected from the group consisting of rosins, rosin esters, rosin alcohols and esters of rosin alcohols which comprises dissolving the material in a gasoline consisting of saturated petroleum hydrocarbons and characterized by substantial absence of aromatic and non-aromatic unsaturated constituents and by a boiling point within the range from about 40° C. to about 300° C. at atmospheric pressure, treating the resulting solution with fuller's earth whereby color bodies are absorbed from the liquid solution, and recovering the material from the treated solution.

10. A process for refining a material selected from the group consisting of rosins, rosin esters, rosin alcohols and esters of rosin alcohols which comprises dissolving the material in a gasoline consisting of saturated petroleum hydrocarbons and characterized by substantial absence of aromatic and non-aromatic unsaturated constituents and by a boiling point within the range from about 40° C. to about 300° C. at atmospheric pressure, treating the resulting solution with furfural whereby the furfural removes color bodies from the solution, and recovering the material from the treated solution.

11. A process for refining a material selected from the group consisting of rosins, rosin esters, rosin alcohols and esters of rosin alcohols which comprises dissolving the material in a gasoline consisting of saturated petroleum hydrocarbons and characterized by substantial absence of aromatic and non-aromatic unsaturated constituents and by a boiling point within the range from about 40° C. to about 300° C. at atmospheric pressure, treating the resulting solution with phenol whereby the phenol removes color bodies from the solution, and recovering the material from the treated solution.

12. A process for refining a material selected from the group consisting of rosins, rosin esters, rosin alcohols and esters of rosin alcohols which comprises dissolving the material in a gasoline from which the aromatic and non-aromatic unsaturated constituents have been substantially completely removed by a prior treatment with sulfuric acid, said gasoline having a boiling point within the range from about 40° C. to about 300° C. at atmospheric pressure, treating the resulting solution with furfural whereby the furfural removes color bodies from the solution, and recovering the material from the treated solution.

13. A process for refining a material selected from the group consisting of rosins, rosin esters, rosin alcohols and esters of rosin alcohols which comprises dissolving the material in a gasoline from which the aromatic and non-aromatic unsaturated constituents have been substantially completely removed by a prior treatment with furfural, said gasoline having a boiling point within the range from about 40° C. to about 300° C. at atmospheric pressure, treating the resulting solution with furfural whereby the furfural removes color bodies from the solution, and recovering the material from the treated solution.

14. A process for refining a material selected from the group consisting of rosins, rosin esters, rosin alcohols and esters of rosin alcohols which comprises dissolving the material in a gasoline from which the aromatic and non-aromatic unsaturated constituents have been substantially completely removed by a prior treatment with liquid sulfur dioxide, said gasoline having a boiling point within the range from about 40° C. to about 300° C. at atmospheric pressure, treating the resulting solution with furfural whereby the furfural removes color bodies from the solution, and recovering the material from the treated solution.

15. A process for refining wood rosin which comprises dissolving the wood rosin in a gasoline from which the aromatic and non-aromatic constituents have been substantially completely removed by a prior treatment with sulfuric acid, said treated gasoline having a boiling point within the range from about 40° C. to about 300° C. at atmospheric pressure, treating the resulting solution with furfural whereby the furfural removes color bodies from the solution, and recovering the rosin from the treated solution.

16. A process for refining wood rosin which comprises dissolving the wood rosin in a gasoline from which the aromatic and non-aromatic constituents have been substantially completely removed by a prior treatment with sulfuric acid, said treated gasoline having a boiling point within the range from about 65° C. to about 130° C. at atmospheric pressure, treating the resulting solution with furfural whereby the furfural removes color bodies from the solution, and recovering the rosin from the treated solution.

17. A process for refining a material selected from the group consisting of rosins, rosin esters, rosin alcohols and esters of rosin alcohols which includes the steps of treating a gasoline which contains aromatic and non-aromatic unsaturated constituents with a reagent adapted to absorb these constituents from the gasoline so as to substantially completely remove these constituents from the gasoline, said treated gasoline having a boiling point within the range from about 40° C. to about 300° C. at atmospheric pressure, dissolving the rosin material in the said treated gasoline, treating the resulting solution with a substance substantially insoluble in the solution but having a capacity for absorbing color bodies therefrom, and recovering the material from the treated solution.

18. A process for refining a material selected from the group consisting of rosins, rosin esters, rosin alcohols and esters of rosin alcohols which includes the steps of treating a gasoline which contains aromatic and non-aromatic unsaturated constituents with sulfuric acid so as to substantially completely remove these constituents from the gasoline, said treated gasoline having a boiling point within the range from about 40° C. to about 300° C. at atmospheric pressure, dissolving the rosin material in the said treated gasoline, treating the resulting solution with a substance substantially insoluble in the solution but having a capacity for absorbing color bodies therefrom, and recovering the material from the treated solution.

19. A process for refining wood rosin which includes the steps of treating a gasoline which contains aromatic and non-aromatic unsaturated constituents with sulfuric acid so as to substantially completely remove these constituents from the gasoline, said treated gasoline having a boiling point within the range from about 40° C. to about 300° C. at atmospheric pressure, dissolving the wood rosin in the said treated gasoline, treating the resulting solution with furfural whereby the furfural removes color bodies from the solution, and recovering the rosin from the treated solution.

20. A process for refining wood rosin which includes the steps of treating a gasoline which contains aromatic and non-aromatic unsaturated constituents with furfural so as to substantially completely remove these constituents from the gasoline, said treated gasoline having a boiling point within the range from about 40° C. to about 300° C. at atmospheric pressure, dissolving the wood rosin in the said treated gasoline, treating the resulting solution with furfural whereby the furfural removes color bodies from the solution, and recovering the rosin from the treated solution.

ROBERT W. MARTIN.